(12) United States Patent
Ganesan

(10) Patent No.: US 11,107,595 B2
(45) Date of Patent: Aug. 31, 2021

(54) FLOATING NUCLEAR REACTOR PROTECTION SYSTEM

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 210 days.

(21) Appl. No.: 16/539,581

(22) Filed: Aug. 13, 2019

(65) Prior Publication Data
US 2020/0411205 A1    Dec. 31, 2020

Related U.S. Application Data

(63) Continuation-in-part of application No. 16/456,587, filed on Jun. 28, 2019.

(51) Int. Cl.
| | |
|---|---|
| *G21C 11/04* | (2006.01) |
| *G21D 3/04* | (2006.01) |
| *F28B 1/02* | (2006.01) |
| *G21D 5/02* | (2006.01) |
| *B63B 35/44* | (2006.01) |
| *G21C 15/18* | (2006.01) |

(52) U.S. Cl.
CPC ............... *G21C 11/04* (2013.01); *F28B 1/02* (2013.01); *G21D 3/04* (2013.01); *B63B 2035/4433* (2013.01); *B63B 2035/4446* (2013.01); *G21C 15/182* (2013.01); *G21D 5/02* (2013.01)

(58) Field of Classification Search
CPC ...... G21C 11/04; G21C 15/18; G21C 15/182; G21C 13/024; G21C 13/00; G21D 1/00; G21D 3/04; G21D 5/02; B63B 2035/4433; B63B 2035/4446; F28B 1/02; Y10S 376/909; Y10S 376/912
See application file for complete search history.

(56) References Cited

U.S. PATENT DOCUMENTS

| | | | | |
|---|---|---|---|---|
| 3,262,411 A | * | 7/1966 | Kaltenecker | ............. B01J 19/00 |
| | | | | 114/26 |
| 3,794,849 A | * | 2/1974 | Perry | ..................... H02G 11/00 |
| | | | | 307/147 |

(Continued)

FOREIGN PATENT DOCUMENTS

| | | | | |
|---|---|---|---|---|
| EP | 3100275 B1 | * | 8/2018 | ............. G21C 15/18 |
| WO | WO-2015171187 A2 | * | 11/2015 | ............... G21D 1/00 |

*Primary Examiner* — Lily C Garner
(74) *Attorney, Agent, or Firm* — Dennis L. Thomte; Thomte Patent Law Office LLC

(57) ABSTRACT

A system is provided for use with a nuclear reactor which is mounted on a barge and which floats in a water tank. The system includes at least one water pipe which extends from a source of water to the interior of the tank. The system also includes a pipe which permits the drainage of water from the water tank. Valves are imposed in the piping so that the water in the tank will have a desired level and temperature. The system also enables fresh water to be supplied to the containment interior of the reactor. Further, the system includes piping and valves to supply water to the condenser and to drain water from the condenser. The system also includes flexible and slack tubular sections positioned in the piping between the barge and the water tank which allows the barge to move while maintaining the integrity of the tubing.

18 Claims, 7 Drawing Sheets

(56) References Cited

U.S. PATENT DOCUMENTS

| | | | | |
|---|---|---|---|---|
| 4,302,291 | A * | 11/1981 | Severs | G21C 13/00 |
| | | | | 376/293 |
| 4,919,882 | A * | 4/1990 | Aul | G21C 13/00 |
| | | | | 376/293 |
| 8,867,691 | B1 * | 10/2014 | Root | B63B 27/143 |
| | | | | 376/277 |
| 9,378,855 | B2 | 6/2016 | Ganesan | |
| 9,396,823 | B2 * | 7/2016 | Ganesan | G21C 13/02 |
| 9,502,143 | B2 * | 11/2016 | Ganesan | G21C 13/024 |
| 10,269,462 | B2 * | 4/2019 | Richardson | B63B 35/44 |
| 10,364,585 | B2 * | 7/2019 | Fischmann | C02F 1/52 |
| 10,619,944 | B2 * | 4/2020 | Cole | F28D 9/0056 |
| 2015/0170771 | A1 * | 6/2015 | Ganesan | G21D 5/02 |
| | | | | 376/247 |
| 2015/0170773 | A1 * | 6/2015 | Ganesan | G21C 15/18 |
| | | | | 376/347 |
| 2016/0203883 | A1 * | 7/2016 | Richardson | G21D 3/04 |
| | | | | 376/317 |
| 2016/0314859 | A1 * | 10/2016 | Ganesan | G21C 13/024 |
| 2017/0292512 | A1 * | 10/2017 | Petzen | F04B 49/24 |
| 2019/0139656 | A1 * | 5/2019 | Ganesan | G21D 1/00 |
| 2021/0003118 | A1 * | 1/2021 | Cole | F16L 27/107 |
| 2021/0098143 | A1 * | 4/2021 | Trojer | B63B 1/107 |

* cited by examiner

FLOATING NUCLEAR REACTOR PROTECTION SYSTEM

CROSS REFERENCE TO RELATED APPLICATION

This is a Continuation-In-Part Application of application Ser. No. 16/456,587 filed Jun. 28, 2019, entitled EMERGENCY COOLING WATER SYSTEM FOR A FLOATING NUCLEAR REACTOR.

BACKGROUND OF THE INVENTION

Field of the Invention

The invention of Applicant's earlier patent application Ser. No. 15/807,182 entitled FLOATING NUCLEAR REACTOR PROTECTION SYSTEM relates to a floating nuclear power reactor. More particularly, the invention of the '182 application relates to a floating nuclear power reactor including a barge which is floatably positioned in the interior of a large water-filled tank or body of water and wherein the nuclear power reactor is positioned on the barge. Even more particularly, the invention of the '182 application relates to a protection system for a floating nuclear power reactor to protect the nuclear reactor from an aircraft strike or a missile strike. Additionally, the protection system of the invention of the '182 application includes structure to reduce the impact forces of an aircraft strike or a missile strike. The instant invention relates to structure to maintain the temperature and water level of the water-filled tank in which the barge of the floating nuclear power reactor is floating.

DESCRIPTION OF THE RELATED ART

Applicant has received U.S. Pat. Nos. 9,378,855; 9,396,823; and 9,502,143 relating to nuclear reactors positioned in a body of water to be able to flood and cool the nuclear reactor in the event of overheating or over pressurization of the nuclear reactor. In Applicant's latest invention shown and described in the co-pending application Ser. No. 15/807,049 filed Nov. 8, 2017, a suspension system is described for suspending and stabilizing a barge which is floating in a large water tank. That system is incorporated herein which further enhances the protection of the nuclear reactor in the event of an aircraft strike or a missile strike.

The invention of Applicant's earlier '182 application provides a protection system for the nuclear power reactor of the co-pending application and to provide protection to other exposed nuclear power reactors of different designs. The prior application and patents of Applicant do not have any means to maintain the temperature and water level of the water-filled tank.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The structure of the floating nuclear reactor of the '182 application will first be disclosed. The floating nuclear reactor of the '182 patent application includes a tank, which may be rectangular, having a bottom wall, an upstanding first end wall, an upstanding second end wall, an upstanding first side wall and an upstanding second side wall. Each of the first end wall, the second end wall, the first side wall and the second side wall of the tank have an outer side, an inner side, a lower end and an upper end. The tank is partially or fully buried in the ground with the tank having water therein.

A barge is floatably positioned in the tank with the barge having a bottom wall, a first end wall, a first side wall, a second side wall and an open second end. A nuclear reactor is positioned on the barge. At least one suspension assembly, and preferably a plurality of suspension assemblies, connect the first end wall of the barge to the first end wall of the tank. At least one suspension assembly, and preferably a plurality of suspension assemblies, connect the first side wall of the tank to the first side wall of the barge. At least one suspension assembly, and preferably a plurality of suspension assemblies, connect the second side wall of the tank to the second side wall of the barge. At least one suspension assembly, and preferably a plurality of suspension assemblies, connect the second end wall of the barge to the second end wall of the tank.

The suspension assemblies permit the barge to move upwardly and downwardly with respect to the tank while maintaining the barge in a level condition. The suspension assemblies permit the barge to move downwardly if struck by a missile or aircraft to lessen the impact thereof.

The nuclear reactor of the '182 patent application is positioned in the tank so as to close the open second end of the barge. The nuclear reactor includes a first containment member which has a cylindrical body portion, a hemi-spherical upper end and a hemi-spherical lower end. The first containment member is comprised of stainless steel or other suitable material. The first containment member is positioned at the open end of the barge with the sides of the containment member being in engagement with the ends of the sidewalls of the barge so as to close the open end of the barge. The positioning of the first containment member causes the outer side of the first containment member to be in contact with the water in the tank. The first containment member defines a sealed interior compartment.

The first containment member has a hatch or door mounted thereon at the lower end thereof which selectively closes an opening in the first containment member. The first containment member also has a pipe extending from the lower end thereof which is in fluid communication with the interior compartment thereof. A normally closed one-way valve is imposed in the pipe.

A reactor vessel is positioned in the interior compartment of the first containment member. The nuclear reactor of the co-pending application has a unique cooling system for the nuclear reactor which does not form a part of this invention.

A heat exchanger is positioned adjacent the first containment member and includes a body section, an upper section and a lower section. The heat exchanger includes an outer wall member or second containment member which is comprised of metal. A vessel is positioned within the second containment member of the heat exchanger. The vessel has an interior compartment which is filled with fluid. The heat exchanger is connected to a turbine or other device.

The suspension assemblies also permit the barge to move downwardly in the tank in the event of an aircraft strike, a missile strike or an earthquake to reduce the impact forces on the barge and nuclear reactor.

A hollow steel conical-shaped member is mounted on the upper end of the first containment member of the nuclear reactor. A hollow steel conical-shaped member is also mounted on the upper end of the heat exchanger. If an aircraft or a missile should strike either of the conical-shaped members, the conical-shaped members would cause the disintegration of the aircraft or missile and would deflect the same.

A roof is positioned over the upper end of the barge which hides the location of the nuclear reactor and heat exchanger from view so that an aircraft attempting to strike either the nuclear reactor or the heat exchanger will not know the precise position of those structures on the barge.

In the preferred embodiment of the invention of the '182 application, the interior of the conical-shaped members on the upper ends of the nuclear reactor and the heat exchanger will be filled with a material which acts as an impact absorbing member. The instant invention provides means for maintaining the temperature and water level of the water-filled tank in which the barge floats.

It is therefore a principal object of the invention to provide a floating nuclear reactor.

A further object of the invention is to provide structure for maintaining the temperature and water level of the water-filled tank in which the barge of the nuclear reactor floats.

A further object of the invention is to provide cooling water to the condenser and to drain hot water from the condenser.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378,855; 9,396,823; and 9,502,143 relating to floating nuclear power reactors. Applicant incorporates the disclosure of the above identified patents in their entirety by reference thereto to complete this disclosure if necessary. Applicant also incorporates the disclosure of application Ser. No. 15/807,182 filed Nov. 8, 2017 in its entirety by reference thereto to complete this disclosure if necessary.

Figure 1:
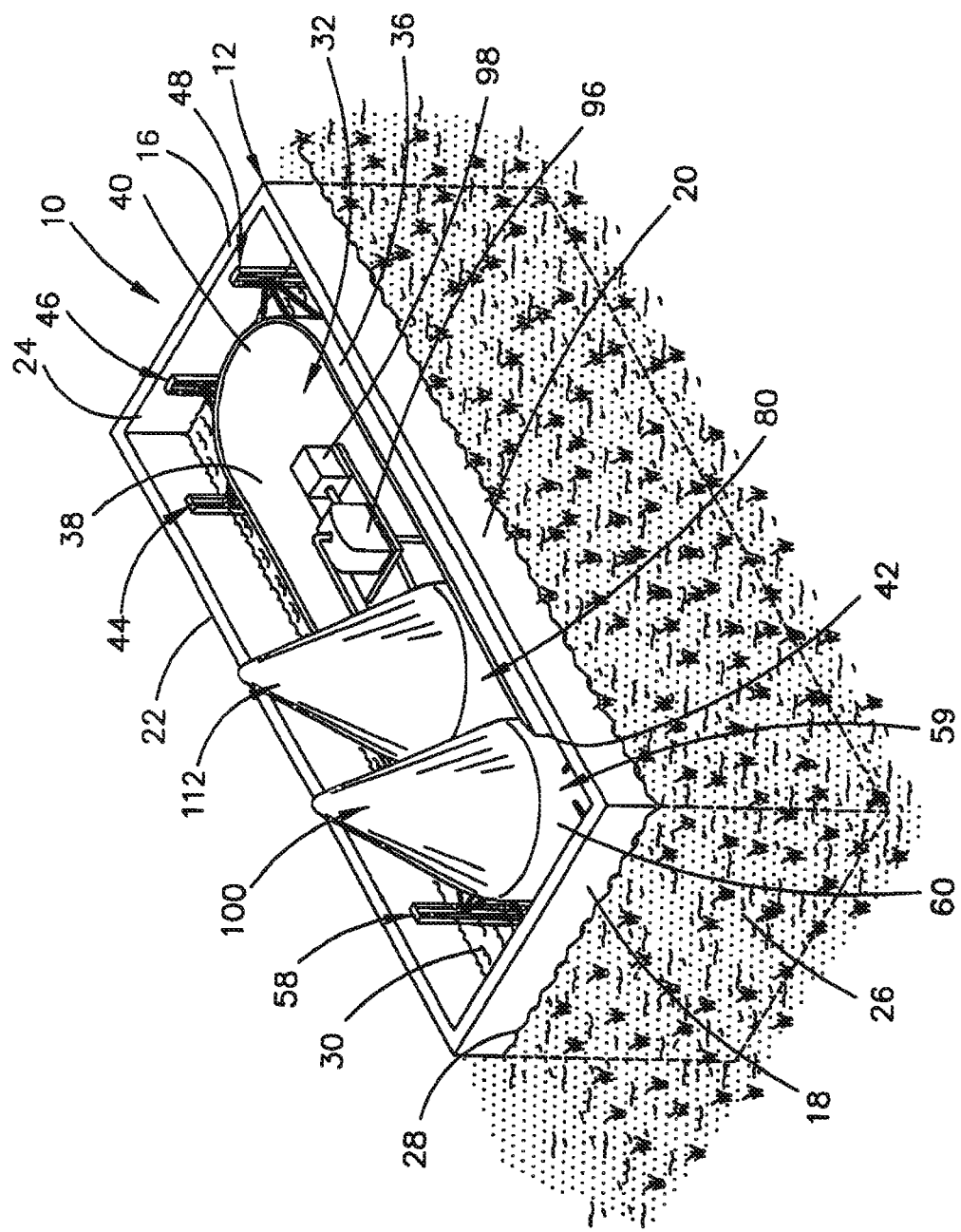
FIG. 1 is a perspective view of a floating nuclear power reactor of the '182 application wherein the nuclear reactor confinement member and the containment member of the heat exchanger have a conical-shaped member on the upper ends thereof.
Figure 2:
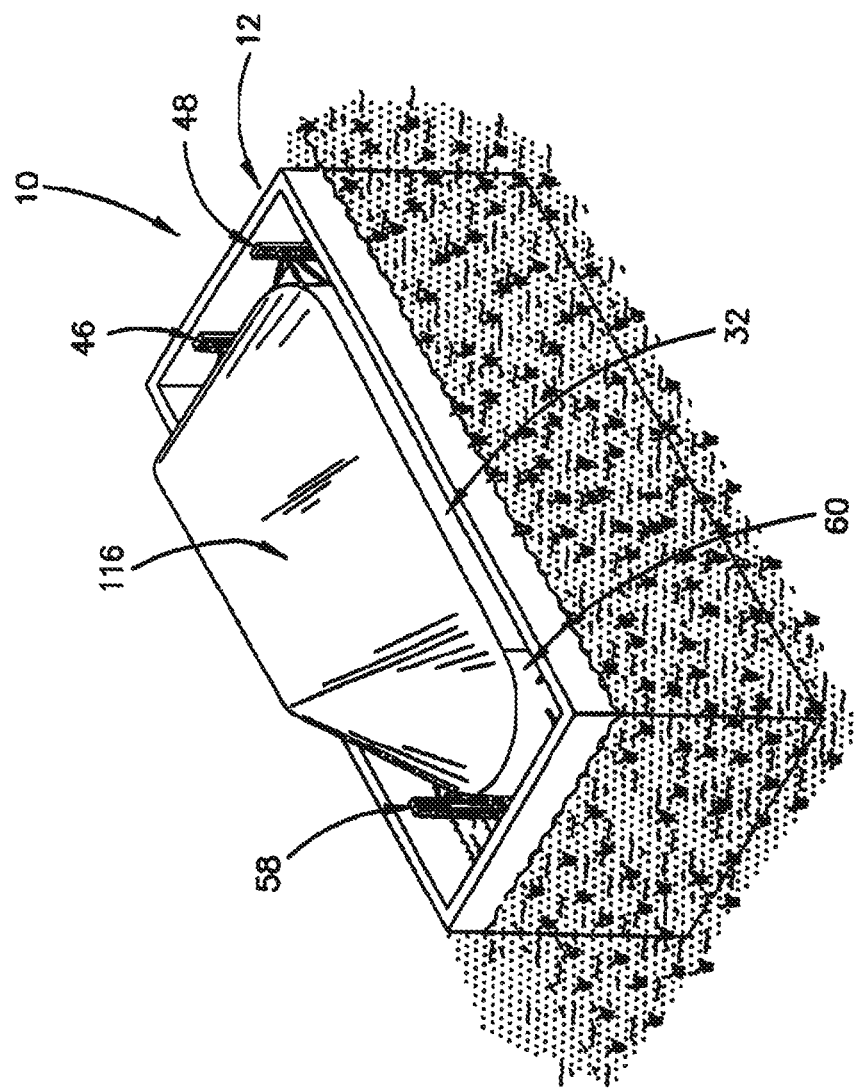
FIG. 2 is a perspective view similar to FIG. 1 except that a roof structure is positioned over the nuclear reactor, the heat exchanger and the barge of the '182 application.

The floating nuclear reactor of the invention of the '182 application, as seen in FIGS. 1-7, is referred to generally by the reference numeral 10. The nuclear reactor 10 floats in a concrete tank 12 having a bottom wall 14, a first end wall 16, a second end wall 18, a first side wall 20, a second side wall 22 and an open upper end 24. Tank 12 is buried in the ground 26 as seen in FIG. 1 so that the open upper end 24 of tank 12 is at or above ground level 28. The tank 12 is partially filled with water 30 from a source of water. Preferably the water 30 is gravity fed to the tank 12. The tank 12 may be completely buried in the ground.

The numeral 32 refers to a barge-like vessel which floats in the tank 12. Barge 32 includes a bottom wall 34, a first side wall 36, a second side wall 38, a semi-circular end wall 40 and an open end 41 at the ends 42 and 43 of side walls 36 and 38 respectively. Barge 32 is comprised of a metal material such as stainless steel, steel, iron, aluminum or other suitable material. Barge 32 is supported in tank 12 by a plurality of upper suspension assemblies 44, 46, 48, 50, 52, 54, 56 and 58 which extend between the barge 32 and the tank 12 as will be described in detail hereinafter. Barge 32 is also supported in tank 12 by a plurality of lower suspension assemblies, identical to suspension assemblies 44, 46, 48, 50, 52, 54, 56 and 58, which are positioned below suspension assemblies 44, 46, 48, 50, 52, 54, 56 and 58.

The numeral 59 refers to a nuclear reactor which is positioned in barge 32 so as to close the open end 41 of barge 32 as will be explained in detail hereinafter. Reactor 59 includes an upstanding containment member 60 which has a cylindrical body portion 62, a hemi-spherical upper end 64 and a hemi-spherical lower end 66. Containment member 60 is comprised of stainless steel or other suitable material. Containment member 60 is positioned at the open end 41 of barge 32 with the sides of containment member 60 being in engagement with the ends 42 and 43 of side walls 36 and 38 respectively of barge 32 and being secured thereto by welding or the like to close the open end 41 of barge 32. The positioning of the containment member 60 as just described causes the outer side of containment member 60 to be in contact with the water 30 in tank 12. Containment member 60 defines a sealed interior compartment 68.

Figure 3:
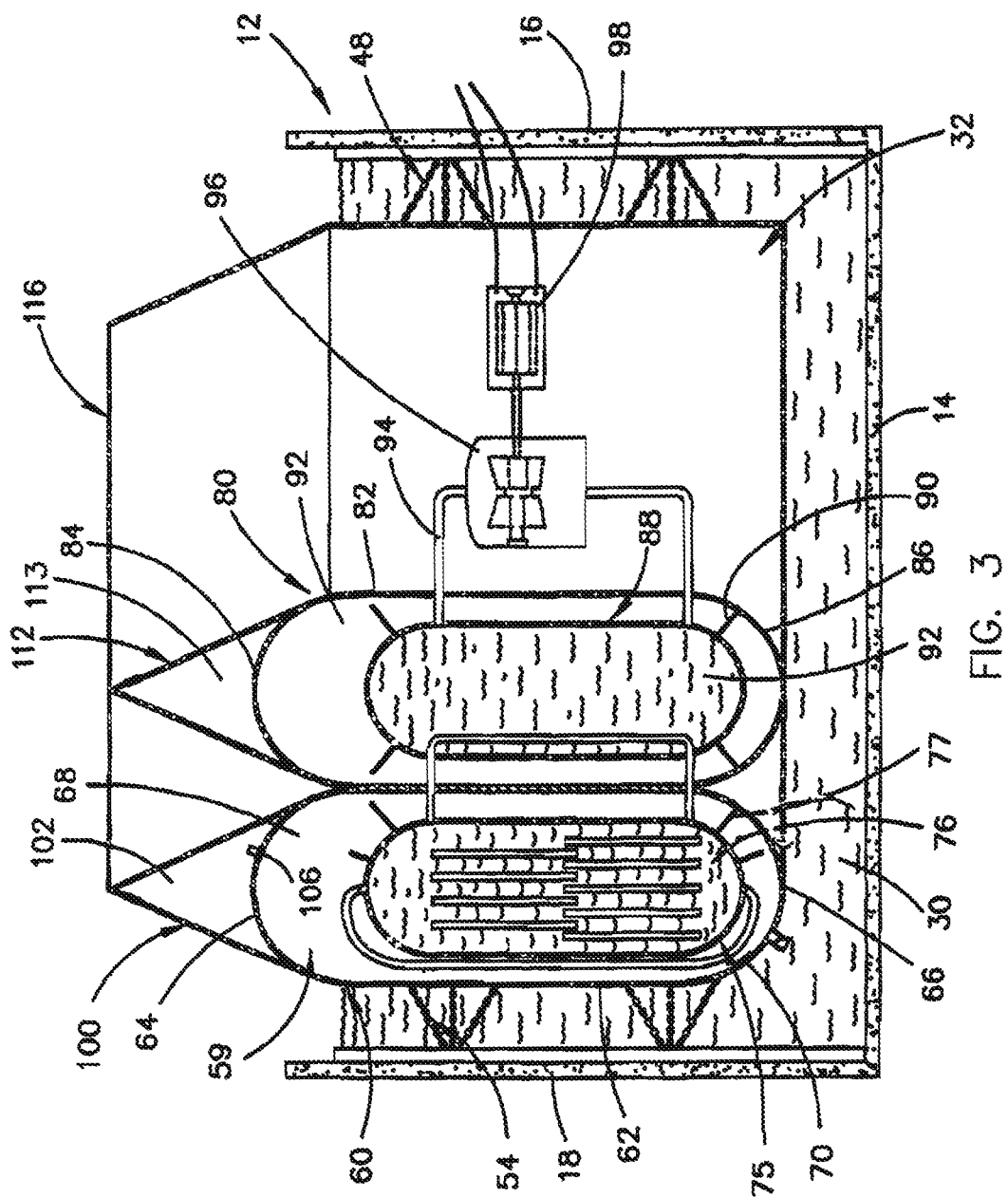
FIG. 3 is a sectional view illustrating the conical-shaped members of the '182 application mounted on the upper ends of the nuclear reactor and the heat exchanger thereof with a roof extending thereover.
Figure 4:
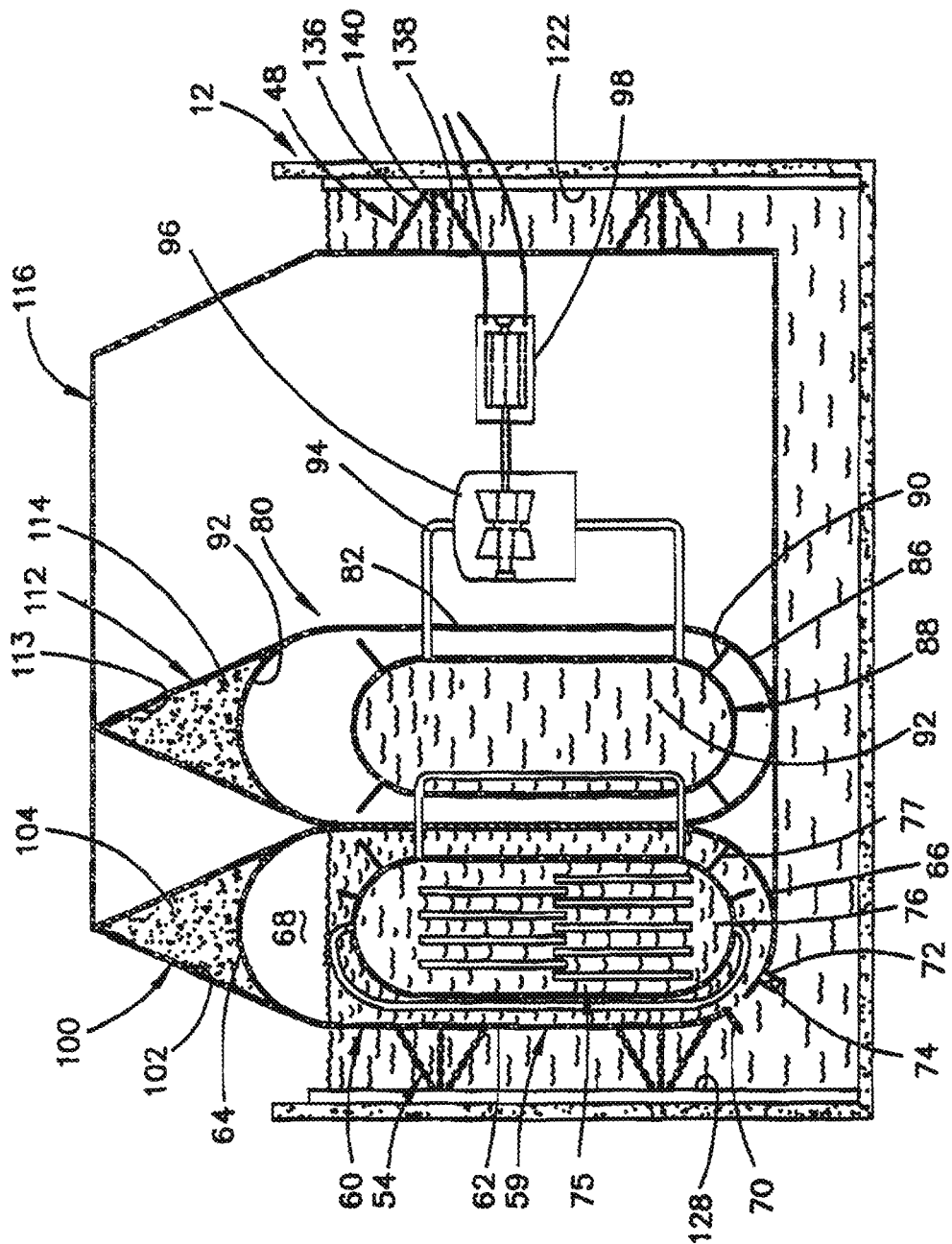
FIG. 4 is a sectional view similar to FIG. 3 except that the conical-shaped members are filled with an impact absorber material.

Containment member 60 has a hatch 70 mounted therein as seen in FIG. 3. Containment member 60 also has a pipe 72 extending from the lower end thereof which is in fluid communication with the interior compartment 68. A normally closed one-way valve 74 is imposed in pipe 72.

A reactor vessel 75 is positioned in compartment 68 and has an interior compartment 76. Vessel 75 is supported in compartment 68 by braces 77 which extend between the exterior of reactor vessel 75 and the interior side of containment member 60 as seen in FIG. 3.

The numeral 80 refers to an upstanding heat exchanger which is positioned adjacent containment member 60 as seen in the drawings. Heat exchanger 80 includes a body section 82, an upper section 84 and a lower section 86. Heat exchanger 80 is comprised of a metal material such as stainless steel or other suitable material. A vessel 88 is positioned within heat exchanger 80 and is supported therein by braces 90 extending therebetween. Vessel 88 defines an interior compartment 92. A tube 93 interconnects the reactor vessel 75 and the vessel 88 of heat exchanger 80 as seen in the drawings. The heat exchanger 80 is connected to a turbine 96, or other device, by tube 94, which is connected to a generator 98 or other structure.

A hollow metal cone 100 is mounted on the hemispherical upper end 64 of containment member 60. Cone 100 is comprised of stainless steel, steel or other suitable material. Cone 100 has an interior compartment 102 which is preferably filled with a filter material 104 which not only may serve as a filtration bed but serves as an impact absorber should the cone 100 be struck by an aircraft or a missile. The cone 100, if struck by an aircraft or missile, will disintegrate or tear apart the aircraft or missile and deflect the aircraft or missile away from the cone 100. An outlet pipe 106 may be provided in the upper end of containment member 60 to permit steam or the like to pass upwardly therethrough onto the filtration material 104.

Figure 5:
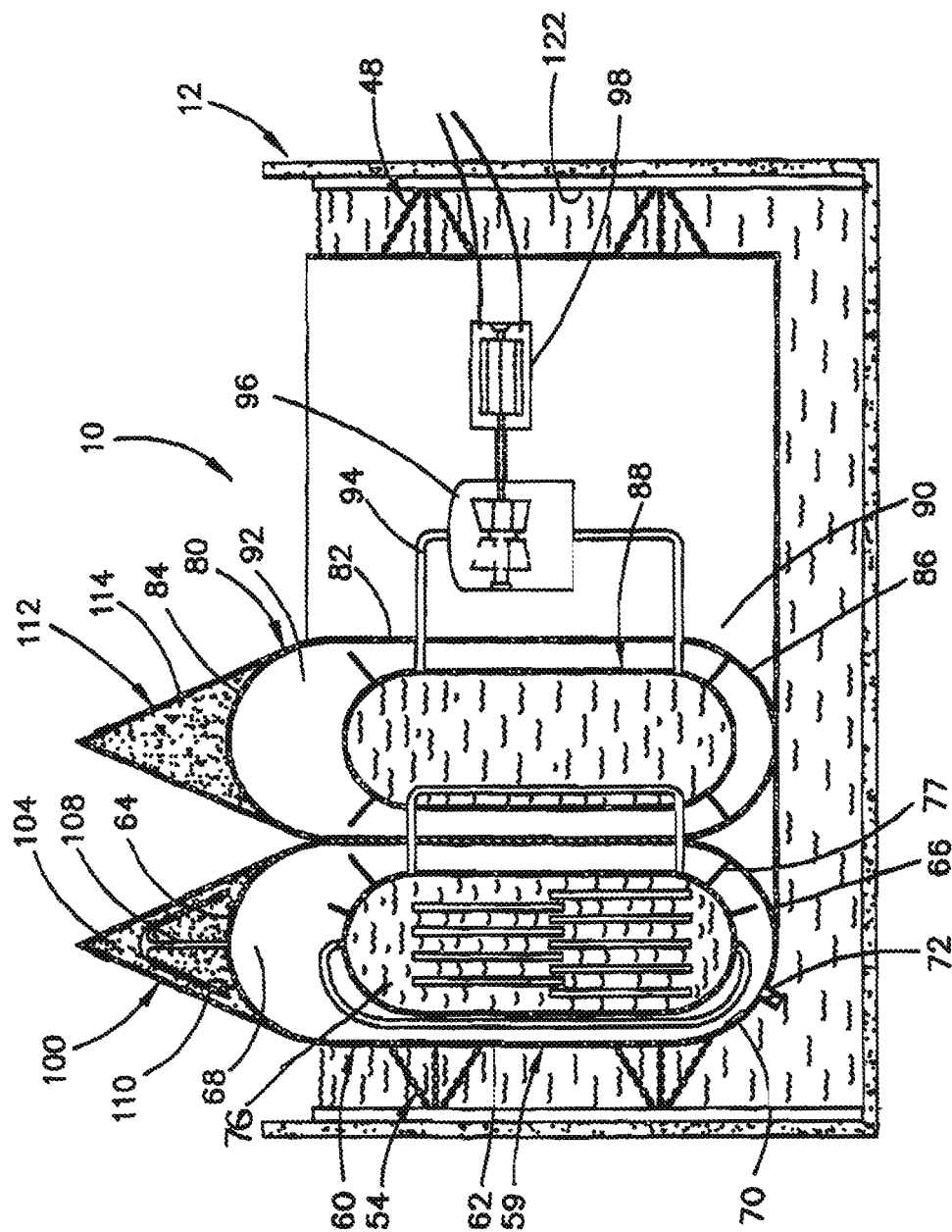
FIG. 5 is a sectional view similar to FIG. 3 except that the conical-shaped members on the nuclear reactor have a filtration material therein and a vent tube assembly therein.
Figure 6:
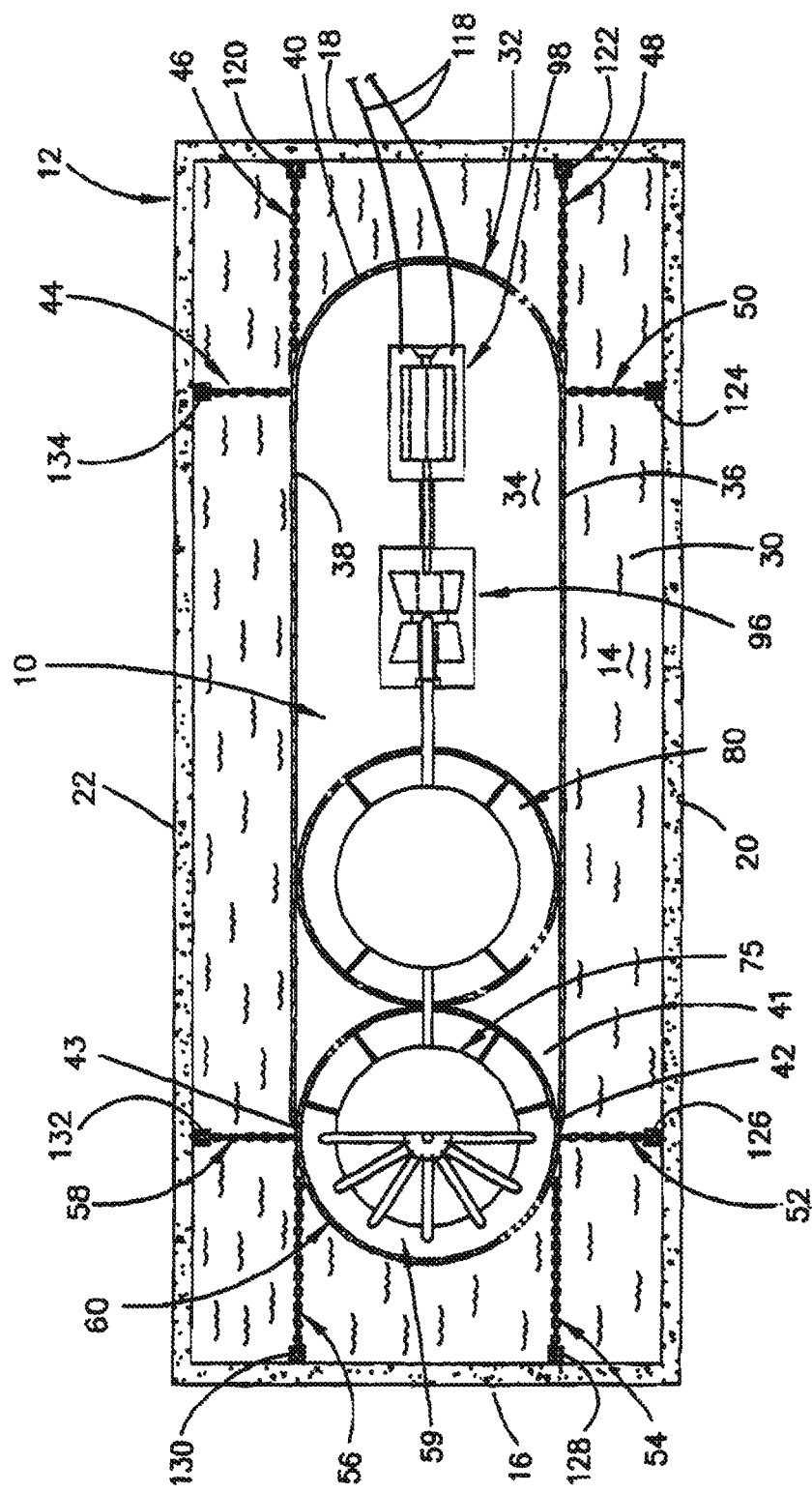
FIG. 6 is a sectional view which illustrates the suspension assemblies of the '182 application which suspend the barge in the water-filled tank.
Figure 7:
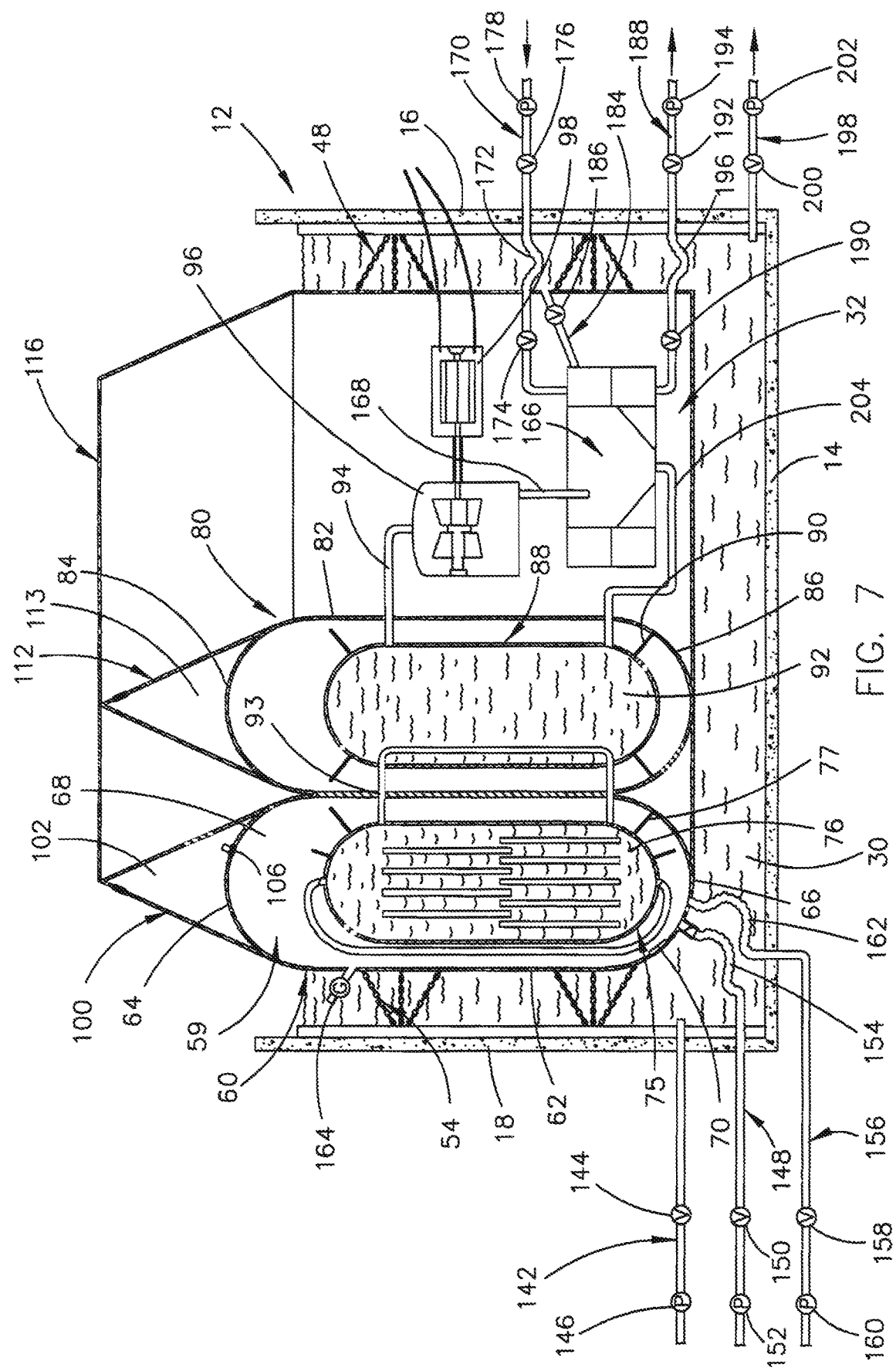
FIG. 7 is a sectional view which illustrates the structure of the '182 application and the structure of this invention which maintains the temperature and water level of the tank in which the nuclear reactor floats.

The cone 100 may also have a discharge tube assembly 108 extending upwardly from pipe 106 and which has discharge tubes 110 extending downwardly and outwardly from the upper end of tube 108 as seen in FIG. 5.

A metal cone 112 extends upwardly from the upper end of heat exchanger 80 and is filled with an impact absorbing material 114. Cone 112, if struck by an aircraft or missile, will disintegrate the aircraft or missile in the same manner as the cone 100.

A roof 116 extends over the cones 100, 112 and the barge 32 to hide the reactor 59 and the heat exchanger 80 from view. Thus, if an aircraft is attempting to strike the reactor 59, the pilot of the aircraft will not be able to determine the exact location of the reactor 59.

A pair of vertically disposed guide tracks or channels 120 and 122 are secured to the inner side of end wall 18. A pair of vertically disposed guide tracks or channels 124 and 126 are secured to the inner side of side wall 20. A pair of vertically disposed guide tracks or channels 128 and 130 are secured to the inner side of end wall 16. A pair of vertically disposed guide tracks or channels 132 and 134 are secured to the inner side of side wall 22. Each of the guide tracks 120, 122, 124, 126, 128, 130, 132 and 134 have an upper wheel and a lower wheel vertically movable therein. The guide tracks 120, 122, 124, 126, 128, 130, 132 and 134 form a part of the suspension assemblies 46, 48, 50, 52, 54, 56, 58 and 44 respectively.

Inasmuch as the suspension assemblies 44, 46, 48, 50, 52, 54, 56 and 58 are identical except for length, only suspension assembly 48 will be described in detail. Suspension assembly 48 includes an upper chain member 136, a lower chain member 138 and an intermediate chain member 140. The outer ends of chain members 136, 138 and 140 are secured to the upper wheel in guide track 122. The inner ends of chain members 136, 138 and 140 are secured to the barge 32. As seen, upper chain member 136 extends upwardly and inwardly from guide track 122 to barge 32. As also seen, lower chain member 138 extends downwardly and inwardly from guide track 122 to barge 32. Further, as seen, intermediate chain member 140 extends horizontally inwardly from guide track 122 to barge 32. The suspension assembly below suspension assembly 46 would be similarly attached to the lower wheel in guide track 122 and the barge 32. The other suspension assemblies would be attached to the guide tracks 124, 126, 128, 130, 132 and 134 and the barge 32.

The suspension assemblies 44, 50, 56 and 58 are identical. The suspension assemblies 46, 48, 54 and 56 are identical. The only difference between the suspension assemblies 44, 50, 56, 58 and the suspension assemblies 46, 48, 54 and 56 is that the suspension assemblies 46, 48, 54 and 56 are somewhat longer than the suspension assemblies 44, 50, 56 and 58. As stated in the co-pending patent application, the guide tracks or channels could be secured to the barge rather than being secured to the walls of the tank. In that embodiment, the ends of the chains of the suspension assemblies would be secured to the tank.

Although it is preferred that each of the suspension assemblies have a horizontally disposed intermediate chain member 140, the intermediate chain member 140 may be omitted in some situations.

If an aircraft or a missile should strike either of the cones 100 or 112, the cones will disintegrate and deflect the aircraft or the missile to prevent damage to the nuclear reactor. Additionally, the impact absorbing material in the cones 100 and 112 will lessen the damage to the nuclear reactor. Further, if the barge 32 or the cones 100 and 112 are struck by an aircraft or missile, the suspension systems will permit the barge 32 to move downwardly in the tank 12 to lessen or absorb the impact forces of the strike.

The instant invention will now be described.

The numeral 142 refers to a water inlet pipe or tube to bring water into the water tank 12 from a large source of water preferably by gravity. Inlet tube 142 includes a valve 144 to control the rate of flow of the water therethrough. An optional pump 146 in inlet tube 142 would help to accelerate the flow of water through inlet tube 142 if necessary. This helps to maintain the temperature and water level of the tank 16 at an optimal range. Valve 144 and pump 146 may be remotely controlled.

The numeral 148 refers to a flexible water inlet water pipe or tube for bringing water into the interior compartment 68 of containment member 60 from a large source of water preferably by gravity. A valve 150 is provided in inlet tube 148 to control the rate of flow of water therethrough. An optional pump 152 in inlet tube 148 helps to accelerate the flow of water through inlet tube 148 if necessary. Valve 150 and pump 152 may be remotely controlled. Inlet tube 148 has a flexible, slack and folded tubular section 154 at its inner end.

The numeral 156 refers to a flexible water inlet pipe or tube for bringing water into the interior compartment 68 of containment member 60 from a large source of water preferably by gravity. A valve 158 is provided in inlet tube 156 to control the rate of flow of water therethrough. An optional pump 160 in inlet tube 156 helps to accelerate the flow of water through inlet tube 156 if necessary. Valve 158 and pump 160 may be remotely controlled. Inlet tube 156 has a flexible, slack and folded tubular section 162 at its inner end.

The inlet tubes 148 and 156 deliver cold water directly into the interior compartment 68 of containment member 60 during emergency cooling to cool the cooling loops and the reactor wall thereof. By adjusting the flow of water using the valves 150 and 158 and optional pumps 152 and 160, the temperature of water in the interior compartment 68 of confinement member 60 is optimized during emergency conditions in the containment compartment 68 during emergency cooling.

The numeral 164 refers to a gate which is situated in the upper part of containment member 60 just below water level. Gate 164 is opened during emergency cooling of the reactor. The outflow of water through gate 164 permits additional cold water to enter the interior compartment 68 of containment member 60 via flexible tubes 148 and 156 which helps to maintain maximum cooling conditions in the interior compartment 68 of containment member 60 during emergency cooling.

The numeral 166 refers to a conventional condenser. A pipe or tube 168 connects turbine 96 and condenser 166. An inlet pipe or tube 170 extends from a large source of water preferably fed by gravity to the condenser 166. Inlet tube 170 has a flexible, slack and folded tubular section 172 imposed therein. Valves 174 and 176 are imposed in tube 170. An optional pump 178 may be imposed in tube 170.

A water inlet pipe or tube 184 extends inwardly from the tank water to the condenser 166. A valve 186 is imposed in tube 184. The purpose of tube 184 is to fill water from the tank 16 into the condenser 166 by gravity. Tube 184 functions as a back-up in case of a break in tube 170.

An outlet pipe or tube 188 extends from condenser 166 to a location outwardly of tank 16 by gravity. Tube 188 drains hot water from the condenser 166. Valves 190 and 192 are imposed in tube 188. Optional pump 194 may also be imposed in tube 188. Tube 188 includes a flexible, slack and folded tubular section 196 positioned in tank 12 as seen in FIG. 8. The valves 174 and 176 in tube 170 adjust the flow of inlet water into the condenser 166 with the optional pump 178 accelerating the inlet flow of water if necessary. The valves 190 and 192 in tube 188 adjust the outlet flow of water from the condenser 166 with the pump 194 accelerating the outlet of water if necessary. The valves 174, 176, 190 and 192 maintain optimal cooling temperature of the cooling water in condenser 166. The valves 174 and 190 serve as backups to valves 176 and 192 respectively. As seen, the valves 176 and 192 are located on land while valves 174 and 190 are located inside the barge 16.

The numeral 198 refers to an outlet pipe or tube for draining the water from tank 16 preferably by gravity. A valve 200 is imposed in tube 198 for controlling the flow of water from tank 16. The outlet tube 198 with the valve 200 imposed therein helps to maintain the water level and temperature of the water in tank 12 at an optimal range. An optional pump 202 may be provided in tube 198 to accelerate the flow of water from tank 16 if needed. A pipe or tube 204 extends from condenser 166 to interior compartment 92. The flexible tubing sections 154, 162, 172 and 196, with slack, allow the barge 16 to move while maintaining the integrity of the tubes or pipes 148, 156, 170 and 188 respectively.

The functioning of the instant invention will now be summarized. The inlet pipe 142 brings water from a large source of water preferably by gravity to the water tank 12. The valve 144 in the pipe 142 controls the rate of flow of water to help maintain the temperature and water level of the tank at optimal range. An optional pump 146 is imposed in the inlet pipe 142 to accelerate the water flow if needed.

Water inlet pipes 148 and 156 bring water from a large source of water preferably by gravity to the interior compartment 68 of containment member 60. Both of the tubes 148 and 156 deliver cold water directly to the interior compartment 68 of containment member 60 by utilizing the valves and optional pumps. The system helps to deliver cold water directly into the interior compartment 68 of containment member 60 during emergency cooling to cool the cooling loops and the reactor wall. By adjusting the flow of water using the valves and optional pumps, the temperature of water inside the interior compartment 68 of containment member 60 is optimized during emergency cooling. The valves associated with the pipes 148 and 156 could be controlled from a location farther away from the nuclear reactor.

The gate 164 is open during emergency cooling of the reactor. Water would flow out of the interior compartment 68 of containment member 60 via the gate 164. The outflow from the interior compartment 68 of containment member 60 helps to maintain maximum cooling conditions in the interior compartments 68 during emergency cooling.

Inlet pipe 170 brings water from a large source of water to feed cooling water to the condenser 166 preferably by gravity. Outlet pipe 188 drains hot water from the condenser. The valves in pipes 170 and 188 would adjust the flow of inlet and outlet water and the optional pumps in pipes 170 and 188 would accelerate the flow if needed. Together, they maintain optimal cooling temperature of the water in the condenser 166 to enable the condenser 166 to function with maximal efficiency. The valve 174 in pipe 170 controls the inlet flow of water to the condenser 166 and the valve 190 in pipe 188 controls the outlet flow of water from the condenser to optimize the temperature of the cooling water in the condenser 166. The valves in pipes 170 and 188 adjust the inflow and outflow of water to and from the condenser 166 to optimize the temperature of the cooling water in the condenser 166.

The pipe 198 functions to drain the tank preferably by gravity. The valve 200 in pipe 198 and the optional pump 202 would accelerate the drainage if needed. This helps to maintain the water level and temperature of the water in the tank at optimal range.

The flexible, slack and folded tube sections 154, 162, 172 and 196 have slack to allow the barge to move while maintaining the integrity of the tubes. The pipe 184, having valve 186 imposed therein, permits water from the tank to flow into the condenser 166.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A floating nuclear reactor, comprising:
   a tank having water therein which includes;
   (a) a bottom wall having a first end, a second end, a first side and a second side;
   (b) a first end wall, having a first side, a second side, a lower end and an upper end, extending upwardly from said first end of said bottom wall;
   (c) a second end wall, having a first side, a second side, a lower end and an upper end, extending upwardly from said second end of said bottom wall;
   (d) a first side wall, having a first end, a second end, a lower end and an upper end, extending between said first ends of said first and second end walls;

(e) a second side wall, having a first end, a second end, a lower end and an upper end, extending between said second ends of said first and second end walls;
each of said first end wall, said second end wall, said first side wall and said second side wall of said tank having inner and outer sides;
said tank being buried in the ground whereby said upper ends of said first end wall, said second end wall, said first side wall and said second side wall of said tank are positioned at ground level, above ground level or below ground level;
a barge, having a first end, a second end, a first side and a second side, floatably positioned in said tank;
said barge including:
  (a) an upstanding first end wall having an upper end, a lower end, a first side, a second side, an inner side and an outer side;
  (b) an upstanding first side wall having an upper end, a lower end, a first end, a second end, an inner side and an outer side;
  (c) said first end of first side wall of said barge being joined to said second end of said first end wall of said barge and extending therefrom;
  (d) an upstanding second side wall having an upper end, a lower end, a first end, a second end, an inner side and an outer side;
  (e) said first end of said second side wall of said barge being joined to said first end of said first end wall of said barge and extending therefrom;
  (f) a bottom wall having a first end, a second end, a first side and a second side;
  (g) said bottom wall extending between said lower ends of said first end wall, said first side wall and said second side wall of said barge;
  (h) said barge having an open end at said second ends of said first side wall, said second side wall and said second end of said bottom wall;
an upstanding nuclear reactor positioned on said barge at said second end of said barge;
said nuclear reactor including an upstanding first containment member having a central section, an upper section, a lower section, and an interior compartment;
said first containment member being secured to said second ends of said first and second side walls of said barge and to said second end of said bottom wall of said barge to close said open end of said barge;
said first containment member having an outer portion thereof which is in contact with the water in said tank;
an upstanding nuclear reactor vessel, having an upper section and a lower section, positioned within said interior compartment of said first containment member;
a heat exchanger positioned in said barge adjacent said first containment member;
said heat exchanger having a second containment member extending therearound;
said heat exchanger including a heat exchanger vessel positioned in said second containment member;
said heat exchanger vessel having a fluid therein;
a first device in said barge having a fluid inlet side and a fluid discharge side;
a discharge tube extending from said heat exchanger vessel to said fluid inlet side of said first device;
said first device connected to a second device;
a condenser positioned in said barge;
said condenser having a plurality of inlets and a plurality of outlets;
said fluid discharge side of said first device being in fluid communication with one of said plurality of inlets of said condenser;
a first water pipe having an inlet end and an outlet end;
said first water pipe extending into said tank so that said outlet end of said first water pipe is in fluid communication with the water in said tank;
said inlet end of said first water pipe being in communication with a source of water;
said first water pipe having a valve imposed therein outwardly of said tank;
a second water pipe having an inlet end and an outlet end;
said second water pipe extending into said tank;
said outlet end of said second water pipe being in fluid communication with said interior compartment of said first containment member;
said second water pipe having a valve imposed therein outwardly of said tank;
said inlet end of said second water pipe being in fluid communication with a source of water;
a third water pipe having an inlet end and an outlet end;
said outlet end of said third water pipe being in fluid communication with one of said plurality of said inlets of said condenser;
said third water pipe extending outwardly from said condenser through said barge and through said tank;
said inlet end of said third water pipe being in fluid communication with a source of water;
said third water pipe having a valve imposed therein outwardly of said tank;
a fourth water pipe having an inlet end and an outlet end;
said inlet end of said fourth water pipe being in fluid communication with said one of said plurality of outlets of said condenser;
said fourth water pipe extending outwardly through said barge and said tank;
said outlet end of said fourth water pipe being positioned outwardly of said tank;
said fourth water pipe having a first valve imposed therein outwardly of said tank;
a fifth water pipe having an inlet end and an outlet end;
said inlet end of said fifth water pipe being in communication with the water in said tank;
said fifth water pipe extending outwardly through said tank;
said outlet end of said fifth water pipe being positioned outwardly of said tank;
said fifth water pipe having a first valve imposed therein outwardly of said tank;
a sixth water pipe having an inlet end and an outlet end;
said outlet end of said sixth water pipe being in fluid communication with the water in said heat exchanger; and
said inlet end of said sixth water pipe being in fluid communication with one of said plurality of outlets of said condenser.

2. The floating nuclear reactor of claim 1 wherein some of said water pipes have pumps imposed therein.

3. The floating nuclear reactor of claim 1 wherein some of said water pipes have flexible and slack tubular sections positioned between said tank and said barge.

4. The floating nuclear reactor of claim 1 further including a seventh water pipe having an inlet end and an outlet end with said seventh water pipe extending into said tank so that said inlet end of said seventh water pipe is in fluid communication with a source of water and so that said outlet end of said seventh water pipe is in fluid communication with said interior compartment of said first containment member.

5. The floating nuclear reactor of claim 4 wherein said seventh water pipe has a valve imposed therein outwardly of said tank.

6. The floating nuclear reactor of claim 4 wherein said seventh water pipe has a pump associated therewith outwardly of said tank.

7. The floating nuclear reactor of claim 1 wherein a seventh water pipe, having an inlet end and an outlet end, has said inlet end thereof in fluid communication with the water in said tank and has said outlet end thereof in fluid communication with one of said plurality of inlets of said condenser and wherein said seventh water pipe has a valve imposed therein.

8. The floating nuclear reactor of claim 1 further including a gate, having an inlet end and an outlet end and which has said inlet end thereof in fluid communication with said interior compartment of said first containment member and which has said outlet end thereof in fluid communication with said water in said tank.

9. A floating nuclear reactor, comprising:
a tank having water therein;
a barge floatably positioned in said tank;
an upstanding nuclear reactor positioned on said barge;
said nuclear reactor including an upstanding first containment member having an interior compartment;
an upstanding nuclear reactor vessel positioned within said interior compartment of said first containment member;
a heat exchanger positioned on said barge adjacent said first containment member;
said heat exchanger having a second containment member extending therearound;
said heat exchanger including a heat exchanger vessel positioned in said second containment member;
said heat exchanger vessel having a fluid therein;
a first device in said barge having a fluid inlet side and a fluid discharge side;
a discharge tube extending from said heat exchanger vessel to said fluid inlet side of said first device;
a condenser positioned in said barge;
said condenser having a plurality of inlets formed therein and a plurality of outlets formed therein;
said fluid discharge side of said first device being in fluid communication with one of said inlets of said condenser;
a first water pipe having an inlet end and an outlet end;
said first water pipe extending into said tank so that said outlet end of said first water pipe is in fluid communication with the water in said tank;
said inlet end of said first water pipe being in communication with a source of water;
said first water pipe having a valve imposed therein outwardly of said tank;
a second water pipe having an inlet end and an outlet end;
said second water pipe extending into said tank;
said outlet end of said second water pipe being in fluid communication with said interior compartment of said first containment member;
said second water pipe having a valve imposed therein outwardly of said tank;
said inlet end of said second water pipe being in fluid communication with a source of water;
a third water pipe having an inlet end and an outlet end;

said outlet end of said third water pipe being in fluid communication with one of said inlets of said condenser,
said third water pipe extending outwardly from said condenser through said barge and through said tank;
said inlet end of said third water pipe being in fluid communication with a source of water;
said third water pipe having a valve imposed therein outwardly of said tank;
a fourth water pipe having an inlet end and an outlet end;
said inlet end of said fourth water pipe being in fluid communication with said first outlet of said condenser;
said fourth water pipe extending outwardly through said barge and said tank;
said outlet end of said fourth water pipe being positioned outwardly of said tank;
said fourth water pipe having a first valve imposed therein outwardly of said tank;
a fifth water pipe having an inlet end and an outlet end;
said inlet end of said fifth water pipe being in communication with the water in said tank;
said fifth water pipe extending outwardly through said tank;
said outlet end of said fifth water pipe being positioned outwardly of said tank;
said fifth water pipe having a valve imposed therein outwardly of said tank;
a sixth water pipe having an inlet end and an outlet end;
said outlet end of said sixth water pipe being in fluid communication with the water in said heat exchanger; and
said inlet end of said sixth water pipe being in fluid communication with one of said outlets of said condenser.

10. The floating nuclear reactor of claim 9 wherein some of said water pipes have pumps imposed therein.

11. The floating nuclear reactor of claim 9 wherein some of said water pipes have flexible and slack tubular sections positioned between said tank and said barge.

12. A floating nuclear reactor, comprising:
a tank having water therein;
a barge floatably positioned in said tank;
an upstanding nuclear reactor positioned on said barge;
said nuclear reactor including an upstanding first containment member having an interior compartment;
an upstanding nuclear reactor vessel positioned within said interior compartment of said first containment member;
a first water pipe having an inlet end and an outlet end;
said first water pipe extending into said tank so that said outlet end of said first water pipe is in fluid communication with the water in said tank;
said inlet end of said first water pipe being in communication with a source of water;
said first water pipe having a valve imposed therein outwardly of said tank;
a second water pipe having an inlet end and an outlet end;
said second water pipe extending into said tank;
said outlet end of said second water pipe being in fluid communication with said interior compartment of said first containment member;
said second water pipe having a valve imposed therein outwardly of said tank;
said inlet end of said second water pipe being in communication with a source of water;
a third water pipe having an inlet end and an outlet end;

said inlet end of said third water pipe being in fluid communication with the water in said tank;

said third water pipe extending outwardly through said tank;

said outlet end of said third water pipe being positioned outwardly of said tank; and said third water pipe having a valve imposed therein outwardly of said tank.

13. The floating nuclear reactor of claim 12 wherein each of said first water pipe and said second water pipe has a pump imposed therein.

14. The floating nuclear reactor of claim 12 wherein a gate is positioned between said interior compartment of said first containment member and the water in said tank.

15. The floating nuclear reactor of claim 14 wherein said gate has a valve imposed therein.

16. The floating nuclear reactor of claim 14 wherein said gate is positioned adjacent the upper end of said interior compartment of said first containment member.

17. The floating nuclear reactor of claim 14 including a fourth water pipe, having an inlet end and an outlet end, extending into said tank and wherein said outlet end of said fourth water pipe is in communication with said interior compartment of said first containment member and wherein said inlet end of said fourth pipe is in communication with a source of water outwardly of said tank and wherein a valve is imposed in said fourth pipe outwardly of said tank.

18. The floating nuclear reactor of claim 17 wherein said fourth water pipe has a pump associated therewith outwardly of said tank.

* * * * *